(12) United States Patent
Gu et al.

(10) Patent No.: US 12,438,223 B2
(45) Date of Patent: Oct. 7, 2025

(54) BATTERY MODULE, AND BATTERY PACK AND VEHICLE INCLUDING BATTERY MODULE

(71) Applicant: LG Energy Solution, Ltd., Seoul (KR)

(72) Inventors: Ja-Eon Gu, Daejeon (KR); Jae-Uk Ryu, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 810 days.

(21) Appl. No.: 17/637,688

(22) PCT Filed: Oct. 16, 2020

(86) PCT No.: PCT/KR2020/014196
§ 371 (c)(1),
(2) Date: Feb. 23, 2022

(87) PCT Pub. No.: WO2021/101075
PCT Pub. Date: May 27, 2021

(65) Prior Publication Data
US 2022/0294059 A1    Sep. 15, 2022

(30) Foreign Application Priority Data
Nov. 20, 2019 (KR) .................... 10-2019-0149839

(51) Int. Cl.
*H01M 50/24* (2021.01)
*H01M 50/507* (2021.01)

(52) U.S. Cl.
CPC ......... *H01M 50/24* (2021.01); *H01M 50/507* (2021.01); *H01M 2220/20* (2013.01)

(58) Field of Classification Search
CPC . H01M 50/24; H01M 50/507; H01M 2220/20
(Continued)

(56) References Cited

U.S. PATENT DOCUMENTS 3,919,371 A    11/1975    Jache
4,418,127 A    11/1983    Shambaugh et al.
(Continued)

FOREIGN PATENT DOCUMENTS

CN    101627499 A    1/2010
CN    104064702 A    9/2014
(Continued)

OTHER PUBLICATIONS

Search Report dated May 21, 2024, from the Office Action for Chinese Application No. 202080059226.2 Issued May 22, 2024, pp. 1-3.
(Continued)

*Primary Examiner* — Kevin P Kerns
(74) *Attorney, Agent, or Firm* — Lerner David LLP

(57) ABSTRACT

Disclosed is a battery module, which includes a module case having a predetermined accommodation space; a plurality of battery cells accommodated in the module case; a plurality of bus bar members provided at an upper side of the plurality of battery cells to electrically connect the plurality of battery cells; a support plate disposed between the plurality of battery cells and the plurality of bus bar members to support the plurality of bus bar members; and a foam member filled in a space between the plurality of battery cells at a bottom portion of the support plate.

11 Claims, 9 Drawing Sheets

(58) Field of Classification Search
USPC .................................................. 429/159
See application file for complete search history.

(56) References Cited

U.S. PATENT DOCUMENTS

| | | |
|---|---|---|
| 2007/0259258 A1 | 11/2007 | Buck |
| 2010/0104936 A1 | 4/2010 | Meintschel et al. |
| 2011/0159339 A1 | 6/2011 | Gregor et al. |
| 2012/0003508 A1 | 1/2012 | Narbonne et al. |
| 2013/0122330 A1* | 5/2013 | Hoerpel et al. ....... H01M 50/24 29/623.5 |
| 2014/0255750 A1 | 9/2014 | Jan et al. |
| 2014/0287288 A1 | 9/2014 | Takeda et al. |
| 2015/0140408 A1* | 5/2015 | Hayashida et al. ... H01M 50/24 429/159 |
| 2016/0149169 A1 | 5/2016 | Okura |
| 2016/0248060 A1 | 8/2016 | Brambrink et al. |
| 2017/0018750 A1 | 1/2017 | Wintner |
| 2017/0141378 A1 | 5/2017 | Biskup et al. |
| 2017/0214103 A1 | 7/2017 | Onnerud et al. |
| 2018/0223070 A1 | 8/2018 | O'Neil et al. |
| 2019/0181404 A1 | 6/2019 | Seki et al. |
| 2019/0296310 A1 | 9/2019 | Newman et al. |
| 2020/0194853 A1 | 6/2020 | Yoo et al. |
| 2020/0227708 A1 | 7/2020 | Ahn et al. |

FOREIGN PATENT DOCUMENTS

| | | |
|---|---|---|
| CN | 205863251 U | 1/2017 |
| CN | 206076328 U | 4/2017 |
| CN | 109980138 A | 7/2019 |
| DE | 102012018036 A1 | 3/2014 |
| JP | 2002170535 A | 6/2002 |
| JP | 2010009798 A | 1/2010 |
| JP | 2011150860 A | 8/2011 |
| JP | 2013134828 A | 7/2013 |
| JP | 2016537766 A | 12/2016 |
| JP | 2017524240 A | 8/2017 |
| JP | 2019106264 A | 6/2019 |
| KR | 20150026589 A | 3/2015 |
| KR | 20170001766 U | 5/2017 |
| KR | 20180017695 A | 2/2018 |
| KR | 20190086853 A | 7/2019 |
| KR | 20190092835 A | 8/2019 |
| WO | 2018148282 A1 | 8/2018 |
| WO | 2019083177 A1 | 5/2019 |

OTHER PUBLICATIONS

Extended European Search Report including Written Opinion for Application No. 20889856.9 dated Oct. 6, 2022, pp. 1-5.
International Search Report for PCT/KR2020/014196 dated Jan. 29, 2021. 3 pgs.
The Third Office Action dated Sep. 30, 2024 for Appln. No. CN 202080059226.2, 9 pages. [See p. 8, categorizing the cited references].

* cited by examiner

BATTERY MODULE, AND BATTERY PACK AND VEHICLE INCLUDING BATTERY MODULE

CROSS-REFERENCE TO RELATED APPLICATIONS TECHNICAL FIELD

The present application is a national stage entry under 35 U.S.C. § 371 of International Patent Application No. PCT/KR2020/014196, filed on Oct. 16, 2020, published in Korean, which claims priority to Korean Patent Application No. 10-2019-0149839, filed on Nov. 20, 2019, the disclosures of which are hereby incorporated herein by reference.

TECHNICAL FIELD

The present disclosure relates to a battery module, and a battery pack and a vehicle including the battery module.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module including at least one battery cell first, and then configure a battery pack by using at least one battery module and adding other components.

Specifically, when the battery cells are cylindrical cells, the conventional battery module generally includes a plurality of cylindrical cells stacked on each other, a bus bar member for electrically connecting the plurality of cylindrical cells, and a module case for accommodating the bus bar members, the cylindrical cells and various electronic components of the battery module.

However, in the conventional battery module, a predetermined gap is generated between the cells according to the structural shape of the cylindrical cells. Thus, when an external impact or the like occurs, the battery cells are frequently moved from/to each other, which increases the concern of damage to the battery cells.

Therefore, there is a demand to develop a battery module, which may support battery cells more stably and prevent the battery cells from being damaged due to an external impact or the like, and also to provide a battery pack and a vehicle including the battery module.

DISCLOSURE

Technical Problem

Therefore, the present disclosure is directed to providing a battery module, which may support battery cells more stably, and a battery pack and a vehicle including the battery module.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module, comprising: a module case having a predetermined accommodation space; a plurality of battery cells accommodated in the module case; a plurality of bus bar members provided at an upper side of the plurality of battery cells to electrically connect the plurality of battery cells; a support plate disposed between the plurality of battery cells and the plurality of bus bar members to support the plurality of bus bar members; and a foam member filled in a space between the plurality of battery cells at a bottom portion of the support plate.

The foam member may be filled using a dispenser unit that contains the foam member, and the support plate may have at least one filling guide insert hole for guiding injection of the foam member by the dispenser unit.

The at least one filling guide insert hole may be disposed at an upper side corresponding the space between the plurality of battery cells in a height direction of the module case.

The support plate may include a plate body coupled to the module case at the upper side of the plurality of battery cells; and a plurality of bus bar supports provided to the plate body and disposed to be spaced apart from each other by a predetermined distance so that the plurality of bus bar members are placed thereon.

The at least one filling guide insert hole may be provided to the plurality of bus bar supports.

The filling guide insert hole may be provided in plural, and the plurality of filling guide insert holes may be provided to each bus bar support.

The plurality of filling guide insert holes may be disposed to be spaced apart from each other by a predetermined distance along a longitudinal direction of each bus bar support.

A guide wall protruding to a predetermined height may be provided at an upper side of the plurality of bus bar supports to support a side surface of the plurality of bus bar members.

A guide rib shaped corresponding to facing battery cells may be provided at a lower side of the plurality of bus bar supports.

The guide rib may at least partially contact the upper side of the plurality of battery cells to support the upper side of the plurality of battery cells.

The plurality of battery cells may be provided as cylindrical battery cells, and the cylindrical battery cells may be stacked along a horizontal direction inside the module case.

In addition, the present disclosure further provides a battery pack, comprising: at least one battery module according to the above embodiments; and a pack case configured to package the at least one battery module.

Moreover, the present disclosure further provides a vehicle, comprising at least one battery pack according to the above embodiments.

Advantageous Effects

According to various embodiments as above, it is possible to provide a battery module, which may support battery cells more stably, and a battery pack and a vehicle including the battery module.

Moreover, according to various embodiments as above, it is possible to provide a battery module, which may improve safety of the battery cells by preventing the battery cells from being damaged due to an external impact or the like, and a battery pack and a vehicle including the battery module.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
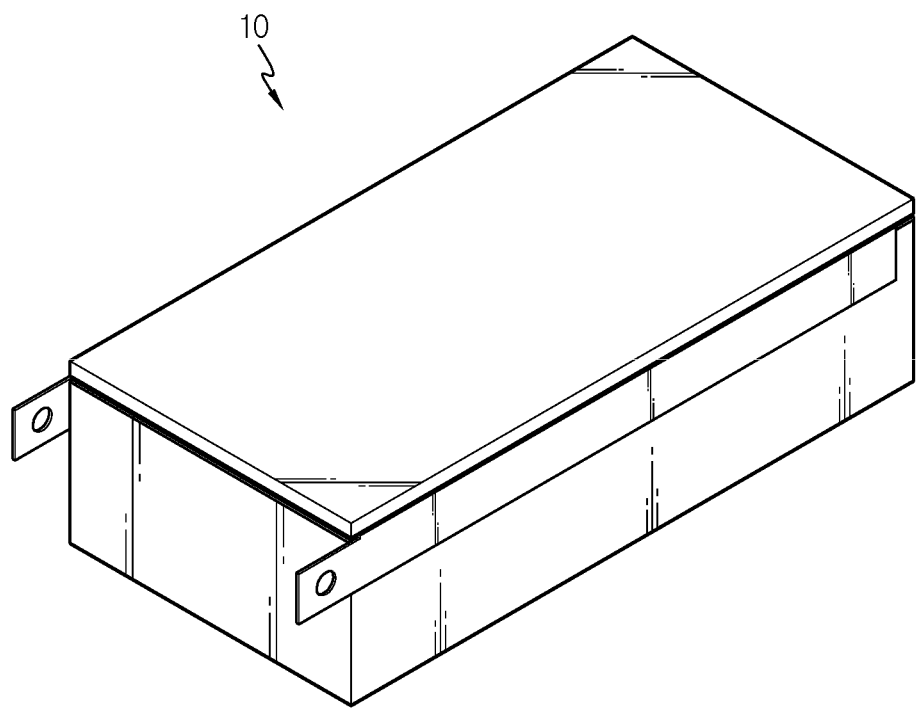
FIG. 1 is a diagram for illustrating a battery module according to an embodiment of the present disclosure.
Figure 2:
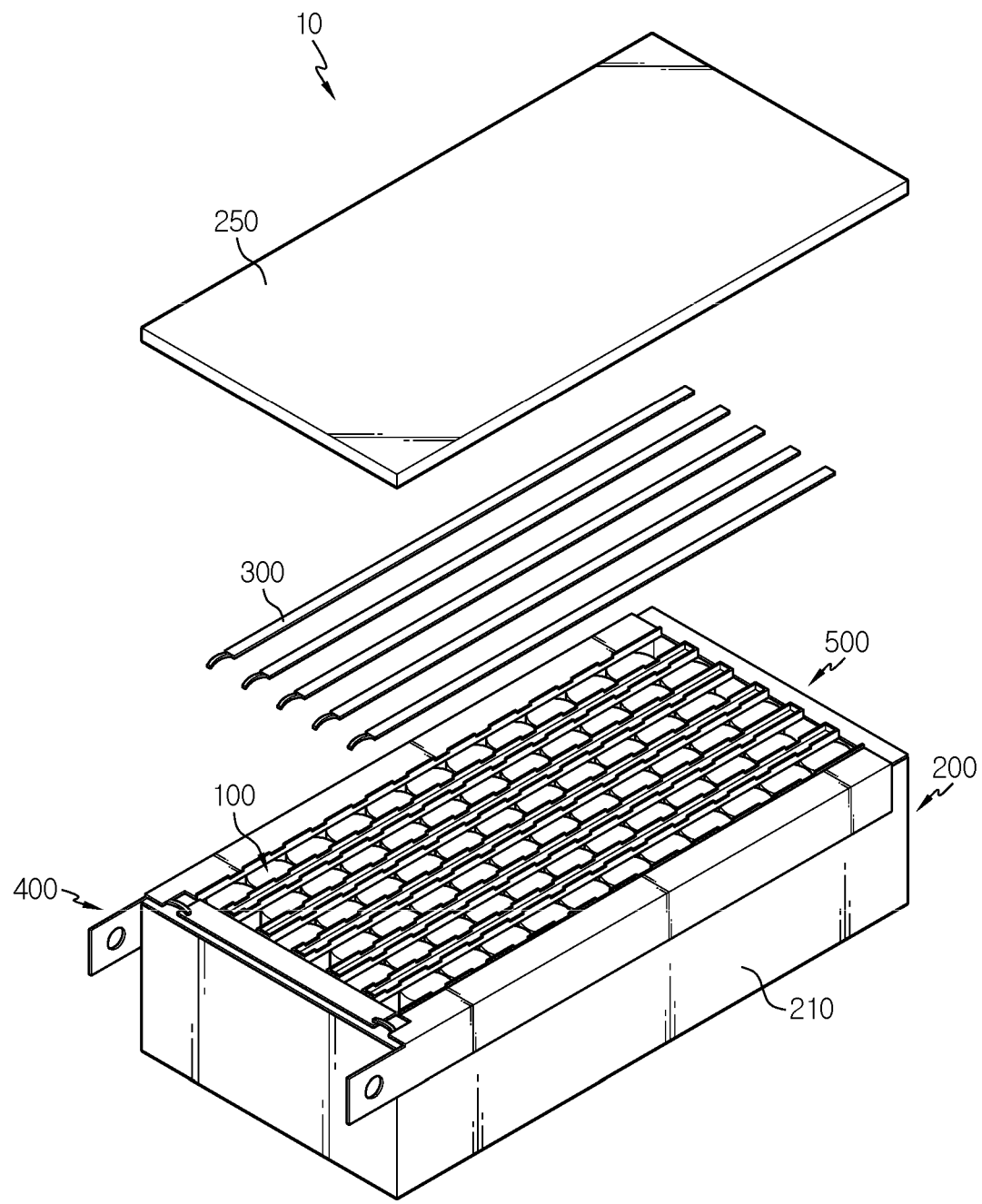
FIG. 2 is a partially exploded perspective view showing the battery module of FIG. 1.
Figure 3:
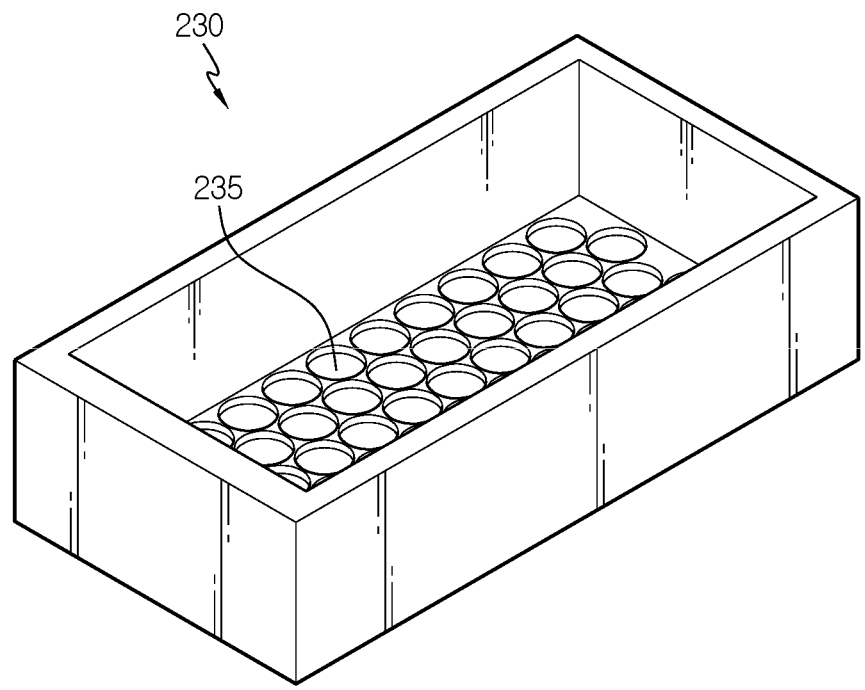
FIG. 3 is a diagram for illustrating a case body according to another embodiment, employed at a module case of the battery module of FIG. 2.
Figure 4:
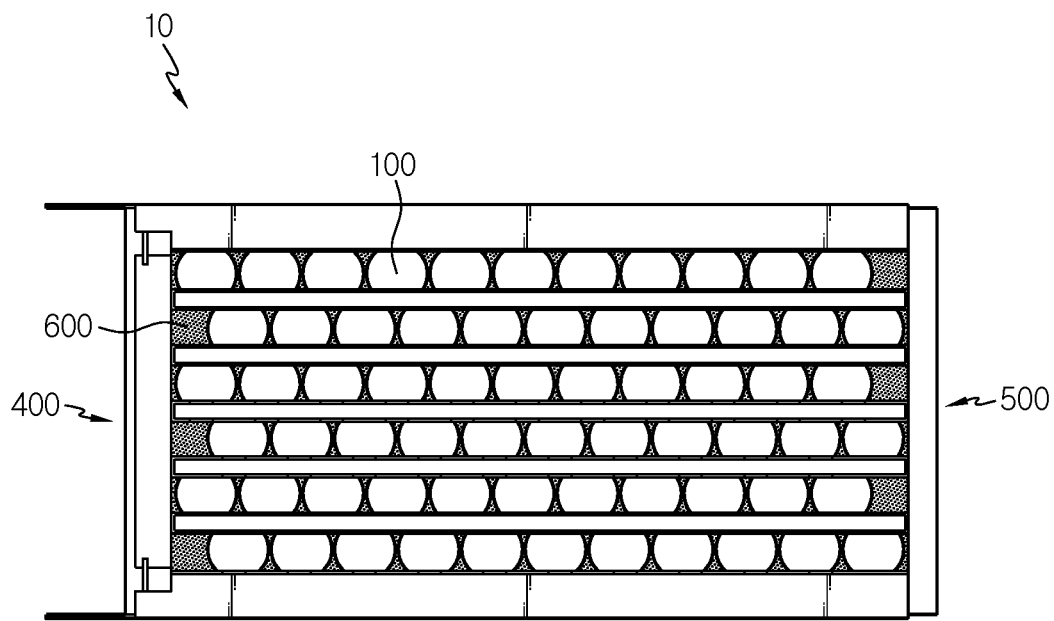
FIG. 4 is a plan view showing a case cover and a bus bar member, employed at the battery module of FIG. 2.
Figure 5:
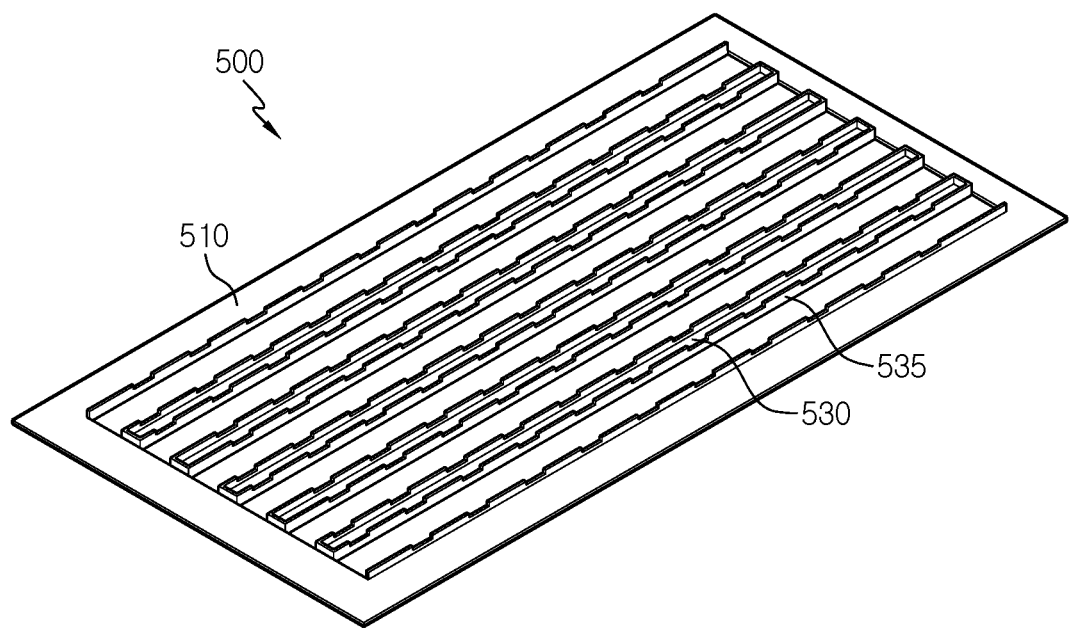
FIG. 5 is a diagram for illustrating a support plate, employed at the battery module of FIG. 4.
Figure 6:
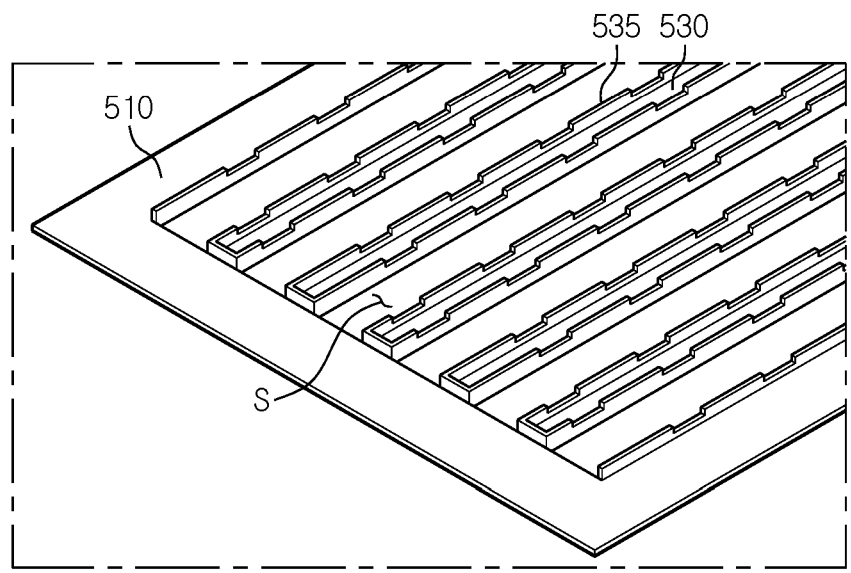
FIG. 6 is a diagram for illustrating a main part of the support plate of FIG. 5.
Figure 7:
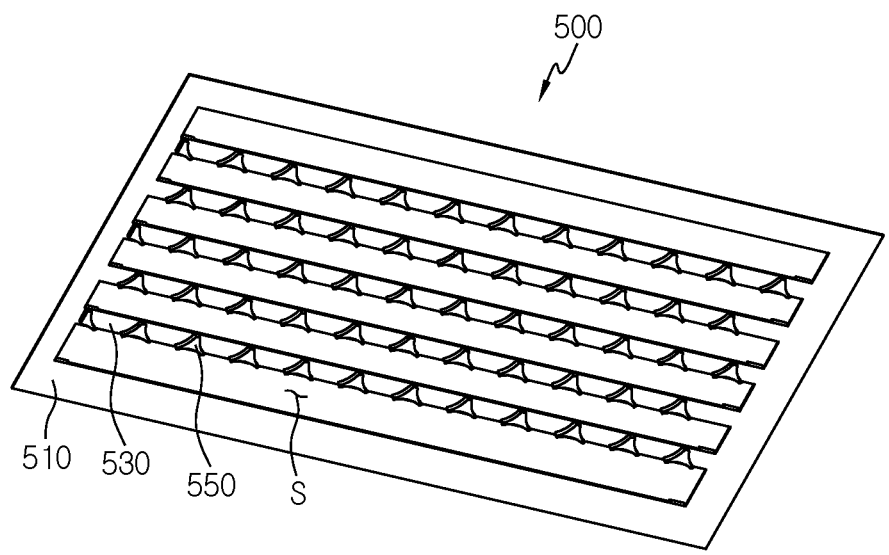
FIG. 7 is a perspective bottom view showing the support plate of FIG. 5.
Figure 8:
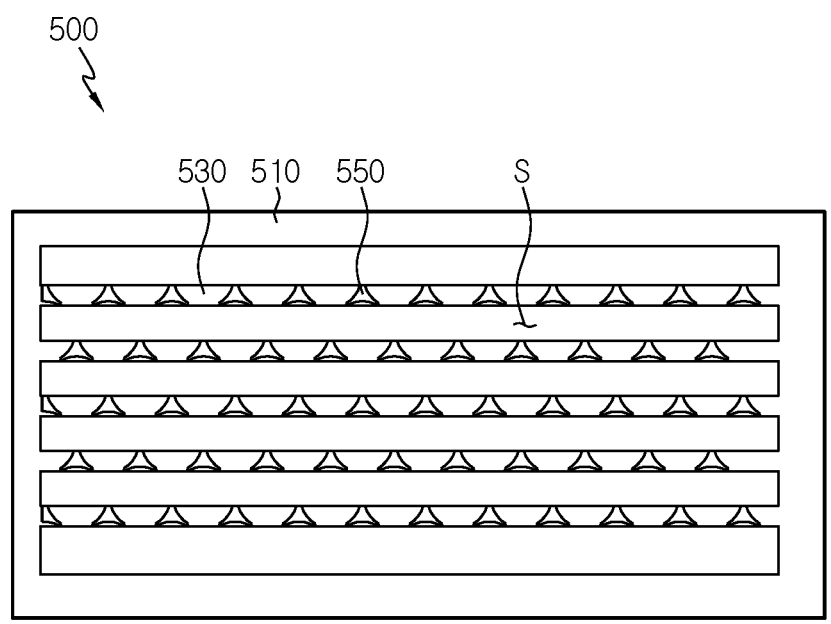
FIG. 8 is a bottom view showing the support plate of FIG. 7.
Figure 9:
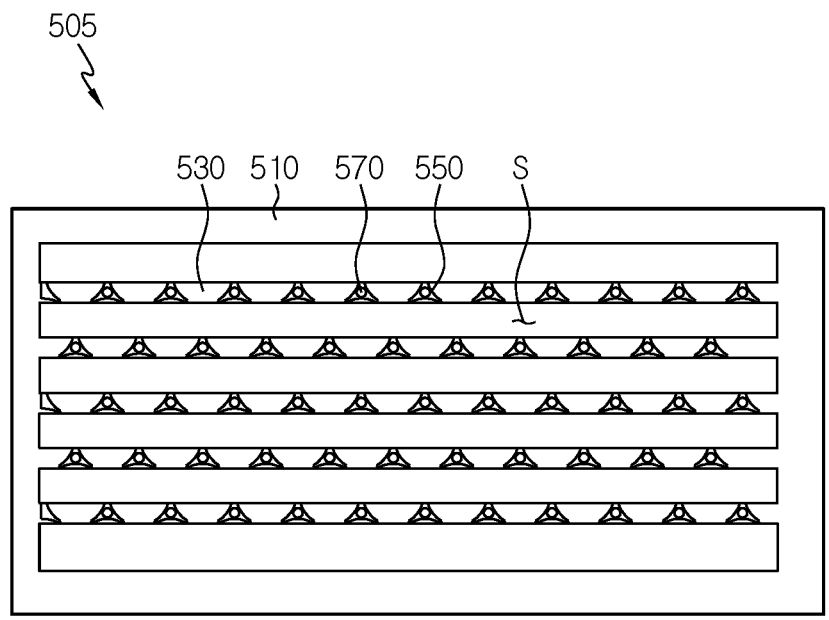
FIG. 9 is a diagram for illustrating a support plate according to another embodiment, employed at the battery module of FIG. 4.

FIG. 1 is a diagram for illustrating a battery module according to an embodiment of the present disclosure, FIG. 2 is a partially exploded perspective view showing the battery module of FIG. 1, FIG. 3 is a diagram for illustrating a case body according to another embodiment, employed at a module case of the battery module of FIG. 2, FIG. 4 is a plan view showing a case cover and a bus bar member, employed at the battery module of FIG. 2, FIG. 5 is a diagram for illustrating a support plate, employed at the battery module of FIG. 4, FIG. 6 is a diagram for illustrating a main part of the support plate of FIG. 5, FIG. 7 is a perspective bottom view showing the support plate of FIG. 5, FIG. 8 is a bottom view showing the support plate of FIG. 7, and FIG. 9 is a diagram for illustrating a support plate according to another embodiment, employed at the battery module of FIG. 4.

Referring to FIGS. 1 to 9, a battery module 10 may include a battery cell 100, a module case 200, a bus bar member 300, a circuit board assembly 400, a support plate 500, and a foam member 600.

The battery cell 100 is a secondary battery and may be provided as a pouch-type secondary battery, a rectangular secondary battery or a cylindrical secondary battery. Hereinafter, in this embodiment, it will be described that the battery cell 100 is provided as a cylindrical battery cell that is a cylindrical secondary battery.

The battery cell 100 may be provided in plural. The plurality of battery cells 100 may be accommodated in the module case 200, explained later. The plurality of battery cells 100 may be stacked in a horizontal direction of the module case 200, explained later, inside the module case 200, explained later.

The module case 200 may accommodate various electric components of the battery cell 100 and the battery module 10. To this end, a predetermined accommodation space may be provided in the module case 200.

The module case 200 may include a case body 210 and a case cover 250.

The case body 210 has the accommodation space and may accommodate various electric components of the plurality of battery cells 100 and the battery module 10.

Meanwhile, as shown in FIG. 3, a plurality of cell insert holes 235 may be formed in an inner bottom of the case body 230. The plurality of cell insert holes 235 may be provided to correspond to the number of the plurality of battery cells 100.

Bottom portions of the plurality of battery cells 100 may be inserted into the plurality of cell insert holes 235. Accordingly, the plurality of battery cells 100 accommodated in the module case 230 may be more stably accommodated in the module case 230.

Moreover, an adhesive or the like may be applied inside the plurality of cell insert holes 235. In this case, the plurality of battery cells 100 may be more stably fixed.

The case cover 250 forms an upper side of the module case 200 and may be coupled with the case body 210, 230 to package the battery cells 100 inside the module case 200.

The bus bar member 300 is provided at an upper side of the plurality of battery cells 100 and may electrically connect the plurality of battery cells 100. The bus bar member 300 may be provided in plural, and the plurality of bus bar members 300 may be disposed to be spaced apart from each other by a predetermined distance.

The circuit board assembly 400 may be electrically connected to the plurality of bus bar members 300. The circuit board assembly 400 may sense a voltage or temperature of the battery cells 100. Moreover, the circuit board assembly 400 may include a terminal for connecting to an external power source or the like, a control board for managing the battery cells 100, and the like.

The support plate 500 is disposed between the plurality of battery cells 100 and the plurality of bus bar members 300 and may support the plurality of bus bar members 300.

The support plate 500 may include a plate body 510, a bus bar support 530, and a guide rib 550.

The plate body 510 may be coupled to the module case 200 at the upper side of the plurality of battery cells 100. The plate body 510 may be disposed between the case body 210, 230 and the case cover 250 of the module case 200.

The bus bar support 530 may be provided in plural. The plurality of bus bar supports 530 are provided to the plate body 510 and are disposed to be spaced apart from each other by a predetermined distance, and the plurality of bus bar members 300 may be placed on the plurality of bus bar supports 530.

A plurality of predetermined spaces S may be provided between the plurality of bus bar supports 530. Through the plurality of predetermined spaces S, the foam member 600 may be injected through a dispenser unit D, explained described.

The plurality of bus bar supports 530 may include a guide wall 535.

The guide wall 535 is provided at an upper side of the plurality of bus bar supports 530 and may protrude to a predetermined height to support a side surface of the plurality of bus bar members 300. Through the guide wall 535, the plurality of bus bar members 300 may be more stably placed and fixed on the bus bar support 530.

The guide rib 550 may be provided in plural, and the plurality of guide ribs 550 may be provided at a lower side of the plurality of bus bar supports 530 to have a shape corresponding to facing battery cells 100.

The plurality of guide ribs 550 may at least partially contact the upper side of the plurality of battery cells 100 to support the upper side of the plurality of battery cells 100. The upper side of the plurality of battery cells 100 may be disposed to be at least partially fitted into an upper side of the plurality of guide ribs 300. Accordingly, the plurality of battery cells 100 may be more stably supported inside the module case 200.

Moreover, the plurality of guide ribs 550 may be at least partially adhered to the plurality of battery cells 100 by means of an adhesive or the like. In this case, the plurality of battery cells 100 may be more stably supported and fixed inside the module case 200.

Meanwhile, as shown in FIG. 9, the support plate 505 may further include a filling guide insert hole 570.

The filling guide insert hole 570 may be provided to have a hole shape of a predetermined size to guide injection of the foam member 600, explained later, through the dispenser unit D, explained later. The filling guide insert hole 570 may be provided in plural.

The plurality of filling guide insert holes 570 may be provided in the plurality of bus bar supports 530. Specifically, the plurality of filling guide insert holes 570 may be provided in each bus bar support 530 to be spaced apart from each other by a predetermined distance along a longitudinal direction of each bus bar support 530.

The plurality of filling guide insert holes 570 may be disposed at an upper side corresponding to a space between the plurality of battery cells 100 in a height direction of the module case 200. Through the plurality of filling guide insert holes 570, the foam member 600, explained later, may be filled, and the filling efficiency of the foam member 600, explained later, may be further increased.

The foam member 600 is for preventing the plurality of battery cells 100 from shaking and may be filled in the space between the plurality of battery cells 100 at the bottom of the support plate 500.

The foam member 600 may be provided as a composite material capable of filling a predetermined space. The foam member 600 may be provided as rubber foam, urethane foam, foam glass, or the like, without being limited thereto, and may also be provided as a material capable of filling other spaces.

When manufacturing the battery module 10, the foam member 600 may be filled into the module case 200 by means of the dispenser unit D that contains the foam member 600.

Hereinafter, the process of filling the foam member 600 according to this embodiment will be described in more detail.

Figure 10:
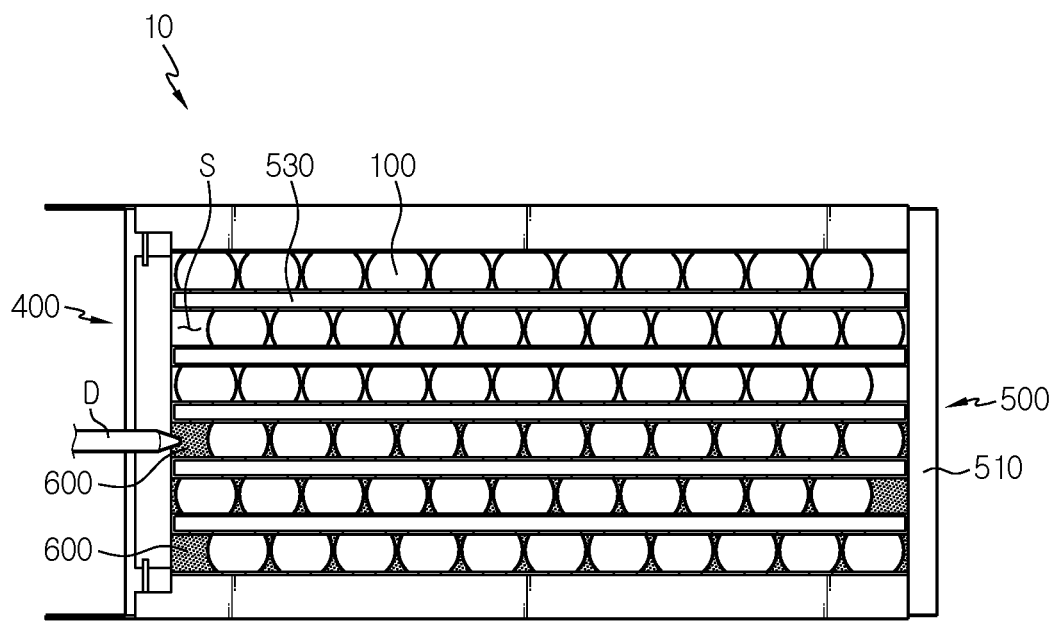
FIGS. 10 and 11 are diagram for illustrating that a foam member is filled in the battery module of FIG. 1.
Figure 11:
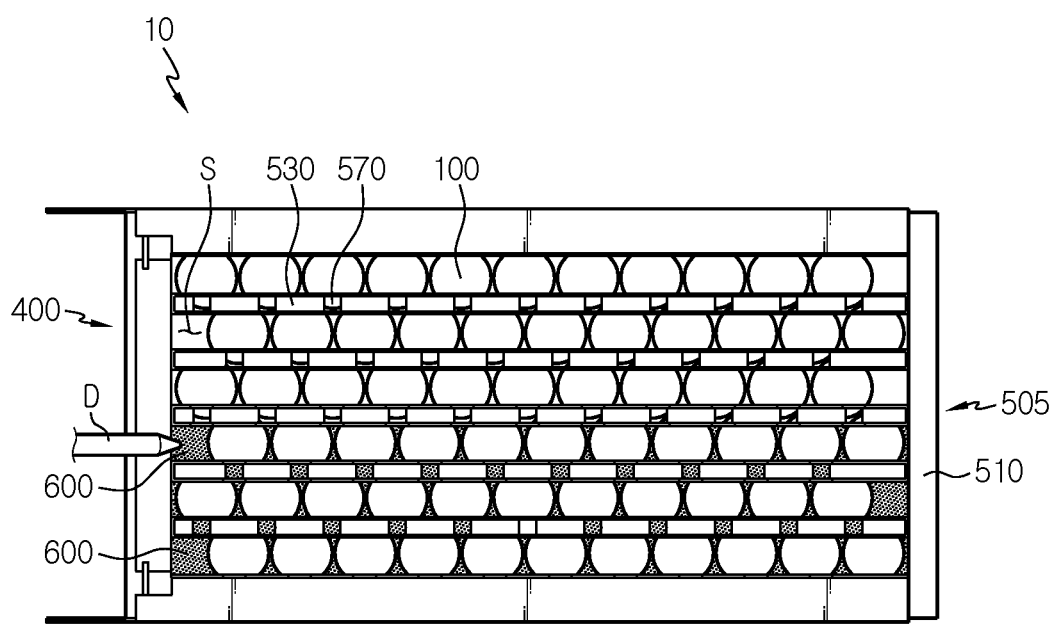

FIGS. 10 and 11 are diagram for illustrating that a foam member is filled in the battery module of FIG. 1.

Referring to FIG. 10, the battery module 10 may be filled with the foam member 600 to prevent the battery cells 100 from shaking and to support and fix the battery cells 100 more stably. The foam member 600 may be filled using the dispenser unit D that contains the foam member 600. A filling nozzle for injecting the foam member 600 may be provided at an end of the dispenser unit D.

In this embodiment, the foam member 600 may be filled by injecting the foam member 600 of the dispenser unit D into the predetermined space S between the bus bar supports 530 of the support plate 500, at the upper side of the plate body 510 of the support plate 500. That is, the foam member 600 may be injected through the dispenser unit D directly at the upper side of the plate body 510 of the support plate 500 through the predetermined space S.

Accordingly, in this embodiment, the foam member 600 of the dispenser unit D may be injected more conveniently, thereby significantly improving the manufacturing efficiency of the battery module 10.

Referring to FIG. 11, the foam member 600 may also be filled through the filling guide insert holes 570 in addition to the predetermined space S between the bus bar supports 530 of the support plate 500. A worker such as a manufacturer may also inject the foam member 600 by inserting the filling nozzle of the dispenser unit D through the filling guide insert hole 570.

Accordingly, the foam member 600 may be more uniformly filled in the space between the battery cells 100, and thus the foam member 600 may be distributed more uniformly in the space between the battery cells 100.

In this embodiment, through the support plate 500, 505, the foam member 600 may be injected more conveniently and directly, and the foam member 600 may be filled more uniformly in the space between the battery cells 100.

If the foam member 600 is completely injected, the worker or the like may place the bus bar member 300 on the bus bar support 530 of the support plate 500 and connect the same to the circuit board assembly 400.

After that, the worker or the like may mount other electric components of the battery module 10 inside the case body 210, 230 of the module case 200, and then connect the case cover 250 to the case body 210, 230.

As described above, in this embodiment, it is possible to support the battery cells 100 more stably by means of the foam member 600 and more effectively prevent the battery cells 100 from shaking due to external shocks. Therefore, in this embodiment, the risk of damage to the battery cells 100 by external impact or the like may be significantly reduced.

Figure 12:
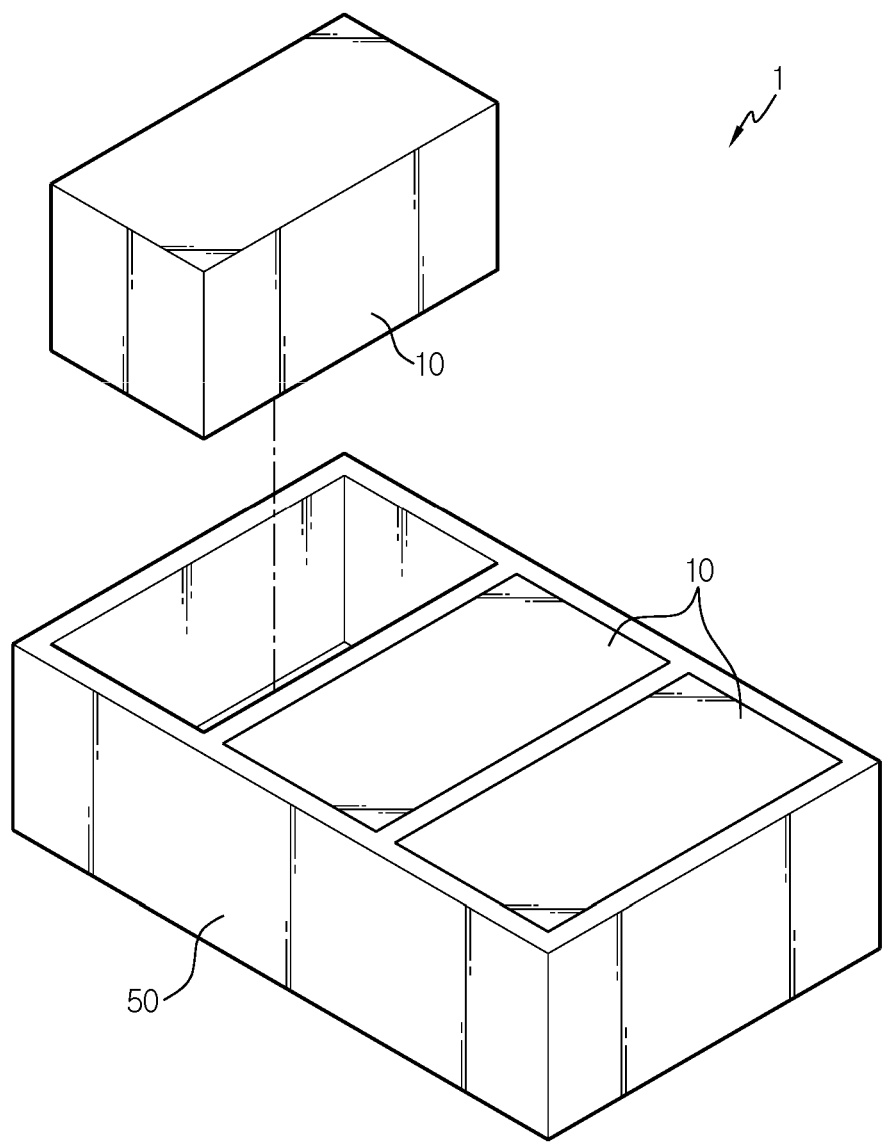
FIG. 12 is a diagram for illustrating a battery pack according to an embodiment of the present disclosure.
Figure 13:
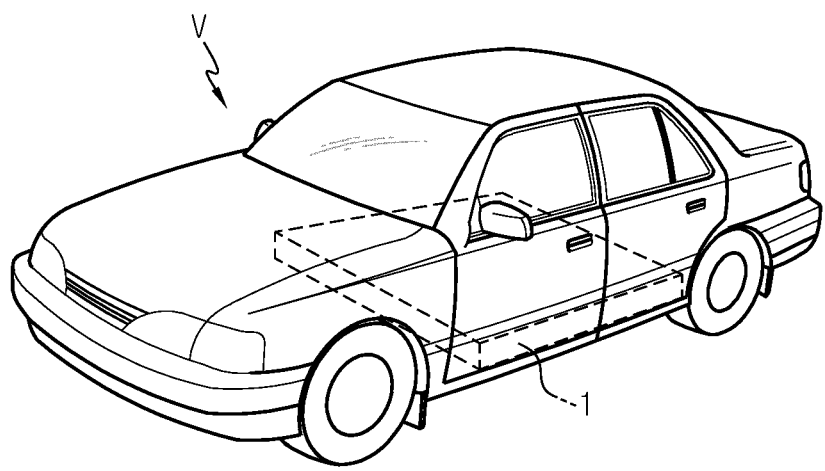
FIG. 13 is a diagram for illustrating a vehicle according to an embodiment of the present disclosure.

FIG. 12 is a diagram for illustrating a battery pack according to an embodiment of the present disclosure, and FIG. 13 is a diagram for illustrating a vehicle according to an embodiment of the present disclosure.

Referring to FIGS. 12 and 13, a battery pack 1 may include at least one battery module 10 and a pack case 50 for packaging the at least one battery module 10 according to the former embodiment.

The battery pack 1 may be provided to a vehicle V as a fuel source of the vehicle. As an example, the battery pack 1 may be provided to an electric vehicle, a hybrid electric vehicle, and various other-type vehicles V capable of using the battery pack 1 as a fuel source.

In addition, the battery pack 1 may be provided in other devices, instruments or facilities such as an energy storage system using a secondary battery, in addition to the vehicle V.

As described above, the battery pack 1 of this embodiment and devices, instruments or facilities such as the vehicle V, which have the battery pack 1, include the battery module 10 as described above, and thus it is possible to implement a battery pack 1 having all the advantages of the battery module 10 described above, or devices, instruments, facilities or the like such as the vehicle V, which have the battery pack 1.

According to various embodiments as above, it is possible to provide a battery module 10, which may support battery cells 100 more stably, and a battery pack 1 and a vehicle V including the battery module 10.

Moreover, according to various embodiments as above, it is possible to provide a battery module 10, which may improve safety of the battery cells 100 by preventing the battery cells 100 from being damaged due to an external impact or the like, and a battery pack 1 and a vehicle V including the battery module 10.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery module, comprising:
a module case having an accommodation space therein;
a plurality of battery cells accommodated in the accommodation space;
a plurality of bus bar members disposed at an upper side of the plurality of battery cells and electrically connecting the plurality of battery cells to each other;
a support plate disposed between the plurality of battery cells and the plurality of bus bar members, the support plate supporting the plurality of bus bar members, the support plate includes a plate body coupled to the module case at an upper side of the module case and a plurality of bus bar supports coupled to the plate body and spaced apart from each other by a predetermined distance so that the plurality of bus bar members are placed on the plate body; and
a foam member filling the accommodation space between the plurality of battery cells below a bottom surface of the support plate,
wherein the support plate has at least one filling guide insert hole therein and is configured to guide injection of foam that forms the foam member therethrough by a dispenser unit.

2. The battery module according to claim 1, wherein the at least one filling guide insert hole is disposed at an upper side of the module case overlying a space between the plurality of battery cells.

3. The battery module according to claim 1, wherein the one filling guide insert hole extends within the plurality of bus bar supports.

4. The battery module according to claim 1, wherein the at least one filling guide insert hole is a plurality of filling guide insert holes, and the plurality of filling guide insert holes each extend within a respective one of the plurality of bus bar supports.

5. The battery module according to claim 4, wherein the plurality of filling guide insert holes are spaced apart from each other by a predetermined distance along a longitudinal direction of each of the plurality of bus bar supports.

6. The battery module according to claim 1, wherein each of the plurality of bus bar supports has a guide wall protruding upward to a predetermined height at an upper side of the plurality of bus bar supports, each guide wall being configured to support a side surface of a respective one of the plurality of bus bar members.

7. The battery module according to claim 1, wherein each of the plurality of bus bar supports has a guide rib facing the battery cells and having a shape complimentary to a shape of the battery cells, each guide rib extending from a lower side of a respective one of the plurality of bus bar supports.

8. The battery module according to claim 7, wherein each guide rib at least partially contacts an upper side of a corresponding one of the plurality of battery cells to support the upper side of the corresponding one of the plurality of battery cells.

9. The battery module according to claim 1, wherein the plurality of battery cells are cylindrical battery cells, and the cylindrical battery cells are stacked adjacent to each other along a horizontal direction inside the accommodation space.

10. A battery pack, comprising at least one battery module each according to claim 1 and a pack case packaging the at least one battery module therein.

11. A vehicle, comprising at least one battery pack each according to claim 10.

* * * * *